US010635806B2

(12) United States Patent
Brown

(10) Patent No.: US 10,635,806 B2
(45) Date of Patent: Apr. 28, 2020

(54) LEAST RECENTLY USED (LRU)-BASED EVENT SUPPRESSION

(71) Applicant: CrowdStrike, Inc., Irvine, CA (US)

(72) Inventor: Daniel W. Brown, Beverly, MA (US)

(73) Assignee: CrowdStrike, Inc., Irvine, CA (US)

( * ) Notice: Subject to any disclaimer, the term of this patent is extended or adjusted under 35 U.S.C. 154(b) by 162 days.

(21) Appl. No.: 15/586,907

(22) Filed: May 4, 2017

(65) Prior Publication Data

US 2018/0322276 A1 Nov. 8, 2018

(51) Int. Cl.
*G06F 21/52* (2013.01)
*G06F 21/55* (2013.01)
*G06F 21/56* (2013.01)
*H04L 29/06* (2006.01)
*H04W 4/08* (2009.01)

(52) U.S. Cl.
CPC ............ *G06F 21/52* (2013.01); *G06F 21/552* (2013.01); *G06F 21/56* (2013.01); *G06F 21/567* (2013.01); *H04L 63/1433* (2013.01); *H04W 4/08* (2013.01); *G06F 2221/033* (2013.01)

(58) Field of Classification Search
CPC .... G06F 12/123; G06F 12/124; G06F 12/125; G06F 12/08; G06F 12/0292; G06F 21/52; G06F 21/552; G06F 21/56; G06F 21/567; G06F 21/22; G06F 5/01; H04L 29/06884; H04L 29/06877; H04L 63/1433
USPC .......... 709/224; 726/22–25; 711/3, 109, 113, 711/118–126, 129–132, 136, 160, 221
See application file for complete search history.

(56) References Cited

U.S. PATENT DOCUMENTS

| | | | | |
|---|---|---|---|---|
| 7,831,773 | B2* | 11/2010 | Zedlewski | G06F 11/3409 711/130 |
| 9,171,157 | B2* | 10/2015 | Flores | G06F 21/55 |
| 2006/0150248 | A1 | 7/2006 | Ross et al. | |
| 2007/0121596 | A1* | 5/2007 | Kurapati | H04L 29/06027 370/356 |
| 2007/0240215 | A1* | 10/2007 | Flores | G06F 21/55 726/24 |
| 2008/0228939 | A1* | 9/2008 | Samuels | H04L 67/2842 709/235 |

(Continued)

OTHER PUBLICATIONS

Extended European Search Report dated Aug. 30, 2018 for European Patent Application No. 18166930.0, 8 pages.

*Primary Examiner* — Saleh Najjar
*Assistant Examiner* — Khalid M Almaghayreh
(74) *Attorney, Agent, or Firm* — Lee & Hayes, P.C.

(57) ABSTRACT

A security agent can implement a least recently used (LRU)-based approach to suppressing events observed on a computing device. The security agent may observe events that occur on a computing device. These observed events may then be inserted into a LRU table that tracks, for a subset of the observed events maintained in the LRU table, a rate-based statistic for multiple event groups in which the subset of the observed events are classified. In response to a value of the rate-based statistic for a particular event group satisfying a threshold for the LRU-table, observed events that are classified in the event group can be sent to a remote security system with suppression by refraining from sending, to the remote security system, at least some of the observed events in the event group. The security agent may cease suppression after the rate-based statistic falls below a predetermined threshold level.

20 Claims, 8 Drawing Sheets

(56) References Cited

U.S. PATENT DOCUMENTS

| | | | |
|---|---|---|---|
| 2008/0229024 A1* | 9/2008 | Plamondon | H04L 67/28 711/126 |
| 2008/0320256 A1* | 12/2008 | Okawa | G06F 12/123 711/160 |
| 2010/0017359 A1* | 1/2010 | Kiernan | G06Q 10/10 706/58 |
| 2011/0055925 A1* | 3/2011 | Jakobsson | G06F 21/552 726/25 |
| 2012/0137367 A1* | 5/2012 | Dupont | G06F 21/00 726/25 |
| 2012/0284221 A1* | 11/2012 | Shelton | H04L 41/0604 706/47 |
| 2013/0333040 A1* | 12/2013 | Diehl | G06F 9/46 726/24 |
| 2014/0051432 A1* | 2/2014 | Gupta | G06F 21/57 455/425 |
| 2014/0143869 A1 | 5/2014 | Pereira et al. | |
| 2015/0205691 A1* | 7/2015 | Seto | G06F 11/008 702/182 |
| 2018/0234302 A1* | 8/2018 | James | H04L 41/145 |

* cited by examiner

| LRU TABLE 200(1) | | | | |
|---|---|---|---|---|
| POSITION 206(1) | PPID 204(1)(a) | IFN 204(1)(b) | CL 204(1)(c) | COUNT 208(1) |
| 1 | | | | |
| 2 | | | | |
| ⋮ | ⋮ | ⋮ | ⋮ | ⋮ |
| P | | | | |

GROUPING SCHEME 202(1) (covers PPID, IFN, CL)

| LRU TABLE 200(2) | | | |
|---|---|---|---|
| POSITION 206(2) | PPID 204(2)(a) | IFN 204(2)(b) | COUNT 208(2) |
| 1 | | | |
| 2 | | | |
| ⋮ | ⋮ | ⋮ | ⋮ |
| Q | | | |

GROUPING SCHEME 202(2) (covers PPID, IFN)

| LRU TABLE 200(3) | | | |
|---|---|---|---|
| POSITION 206(2) | PPID 204(3)(a) | User ID 204(3)(b) | COUNT 208(2) |
| 1 | | | |
| 2 | | | |
| ⋮ | ⋮ | ⋮ | ⋮ |
| R | | | |

GROUPING SCHEME 202(3) (covers PPID, User ID)

| LRU TABLE 200(4) | | |
|---|---|---|
| POSITION 206(4) | PPID 204(4) | COUNT 208(4) |
| 1 | | |
| 2 | | |
| ⋮ | ⋮ | ⋮ |
| S | | |

GROUPING SCHEME 202(4) (covers PPID)

· · ·

| LRU TABLE 200(N) |
|---|
| COUNT 208(N) |
| |

DIMENSIONLESS

Fig. 2

LEAST RECENTLY USED (LRU)-BASED EVENT SUPPRESSION

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

A current approach to counter these threats includes using a security agent that executes locally on a client computing device and interacts with a remote security system in "the Cloud." The locally-executed security agent may observe events that occur on the computing device, and may analyze those events to determine whether the events alone, or in combination, indicate malicious activity. One example type of event that can be observed in this context is what is known as a "process creation" event. A process creation event occurs any time a process is created, such as a process used to execute a program on the computing device. The security agent can observe and analyze such events, as they occur on the computing device, and when malicious activity is detected, the security agent itself can take action designed to counter the malicious activity, and/or the security agent can send those events to the remote security system for further analysis and/or action.

In addition, the security agent can proactively send observed events to the remote security system without analyzing the events at the client computing device. This may be desirable, for example, in order to minimize resource utilization on the client system while leveraging the high compute power of the remote security system, which may execute security software in the Cloud to detect malicious activity based on the received events, and possibly take some action to counter the malicious activity. However, proactively sending every single event observed on the client system to the remote security system comes at a high cost in terms of the amount of data that is transmitted, indexed, and/or stored during the process. Furthermore, events that occur at a relatively high frequency on client systems often contain a high volume of redundant data. For example, a process executing on a client computing device may get caught in a loop where the process spawns, or creates, many sub-processes that share common properties. Considering the fact that this may occur across many client systems that are proactively sending observed events to the remote security system, a significant amount of resources may be tied up in transmitting, indexing, and/or storing redundant data, which is wasteful and unnecessary for the purpose of ensuring adequate security of the client systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates example LRU tables that can be implemented by corresponding suppression correlators to implement LRU-based event suppression.

DETAILED DESCRIPTION

Figure 1:
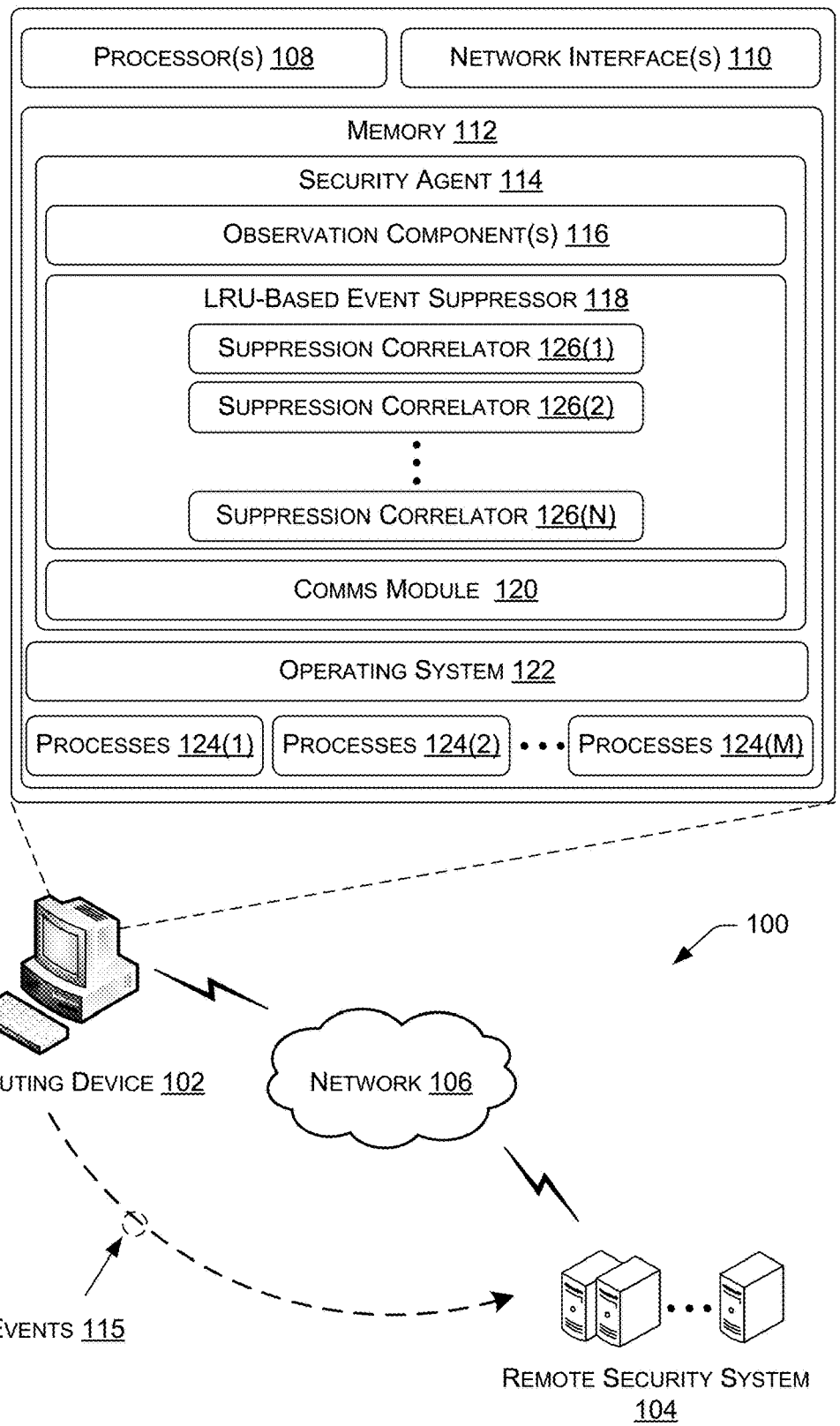
FIG. 1 illustrates an example environment showing an example computing device executing a security agent configured to implement a least recently used (LRU)-based approach to suppressing events observed on the computing device.

This disclosure describes, in part, a security agent that is configured to implement a least recently used (LRU)-based approach to suppressing events observed on a computing device. "Suppressing" events, as used herein, means refraining from sending one or more events, or data related thereto, to a remote security system. Suppression, as used herein, can also include refraining from performing other event-related actions in addition to sending. Such additional actions may include, without limitation, indexing actions, storing actions, processing/analyzing actions, and/or any other suitable action that utilizes resources while handling events.

The techniques and systems described herein use an LRU-based approach to cache recently-observed events so that particular events that frequently occur on the computing device can be isolated, and those isolated events can thereafter be suppressed if they occur at a sustained frequency that exceeds a threshold. This approach is based on the notion that events that occur at a high enough, sustained frequency are likely to include redundant data, and thus, suppressing those events conserves resources without compromising security of the computing device. Thus, when it is determined that particular events are to be suppressed, the security agent can refrain from sending at least some of these particular events to the remote security system, thereby conserving resources that are typically used to handle those events.

In general, the techniques and systems described herein allow for implementing a generalized event suppression algorithm that groups events in different ways, and independently performs rate detection with respect to the various groupings of events such that suppression for one group of events of a first grouping scheme may be triggered independently from suppression for another group of events of a second grouping scheme. Said another way, suppression may be triggered independently for a first group of events grouped according to a first grouping scheme, with or without dependence on whether suppression is triggered for a second group of events grouped according to a second grouping scheme, or vice versa.

According to various embodiments disclosed herein, event suppression may occur as follows. The security agent executing on the computing device may observe events that occur on the computing device. These observed events may be inserted into a LRU table that tracks, for a subset of the observed events maintained in the LRU table, a rate-based statistic for multiple event groups in which the subset of the observed events are classified. Due to the nature of the LRU table, observed events that occur on the computing device at a sufficiently high frequency relative to other events will remain in the LRU table, and thus, the LRU table is configured to maintain a number of the most frequently occurring events on the computing device. The LRU table can therefore be used to track the rate-based statistic for frequently-occurring groups of similar events. Furthermore, the LRU can define an event grouping scheme using a set of event properties such that the rate-based statistic can be tracked with respect to individual ones of multiple, different event groups that classify observed events per the grouping scheme. Once the value of the rate-based statistic for a particular event group satisfies a threshold associated with the LRU table, i.e., a group with particularly frequently occurring events, event suppression can be triggered, whereby observed events that are classified in the particular event group are sent to a remote security system with suppression by refraining from sending, to the remote security system, at least some of the observed events in the particular event group. The security agent may cease suppression after the rate-based statistic falls below a predetermined threshold level. In various embodiments, any or all of the observing, inserting, and/or suppression triggering may occur in parallel with respect to multiple observed events and/or multiple LRU tables.

In some embodiments, multiple LRU tables can be utilized. This may be done by instantiating multiple suppression correlators that are each associated with an LRU table that defines a unique grouping scheme to group events based on a unique set of event properties. For instance, a first suppression correlator may include a first LRU table that defines a first set of properties of a first grouping scheme. Meanwhile, a second suppression correlator may include a second LRU table that defines a second set of properties of a second grouping scheme that is different than the first grouping scheme. In some cases, this second set of properties may comprise a subset of the first set of properties such that the first grouping scheme is more granular than the second grouping scheme. With respect to the first LRU table, observed events having common values for the first set of properties can be inserted into the first LRU table as a first event group, while observed events having different common values for the first set of properties can be inserted into the first LRU table as a second event group, and so on, for as many entries/event groups as the first LRU table is configured to maintain. With respect to the second LRU table, observed events can be inserted in the second LRU table in a similar manner such that cached entries for events may correspond to multiple different event groups according to the second grouping scheme. In addition, each suppression correlator can track rate-based statistics using independent calculations so that event suppression is triggered at different sustained frequency levels for different grouping schemes. Thus, a hierarchy of LRU tables can be defined to enable a "layered approach" to event suppression, whereby a first suppression correlator associated with a first LRU table can act as a first line of defense to trigger event suppression, a second suppression correlator associated with a second LRU table can act as a second line of defense, and so on, for any number of suppression correlators/LRU tables. This allows for event suppression to be triggered with a preference for the most granular grouping scheme over less granular grouping schemes. In this manner, the security agent can send data about ongoing suppression to the remote security system that includes as much detail as possible, which may be beneficial for diagnostic and/or telemetry purposes.

The LRU-based event suppression techniques described herein can be used to identify, isolate, and suppress events that occur at particular sustained frequencies on a computing device. Based on the assumption that such suppressed events likely include a high volume of redundant data, these LRU-based event suppression techniques are configured to conserves resources involved with the proactive transmission of observed events from client systems to a remote security system, which may be performed for detecting malicious activity on the computing device, as described herein. In fact, the remote security system may receive events from many client systems that send events proactively to the remote security system on a continuous basis. For an entity that operates or maintains such a remote security system, this may translate into reduced cost of operating the remote security system in instances where the entity pays for utilization of such resources, such as storage and processing resources. Furthermore, event suppression can occur without compromising the level of security provided by the security agent. This is due, at least in part, to the fact that unique events that include unique data can still be sent proactively to the remote security system, as the LRU-based approach described herein will effectively not suppress the unique events so long as these events don't occur at a sustained frequency level that is high enough trigger event suppression.

FIG. 1 illustrates an example environment 100 that includes an example computing device 102 configured to implement a least recently used (LRU)-based approach to suppressing events observed on the computing device 102. As illustrated in FIG. 1, a computing device 102 may interact with a remote security system 104 over a network 106. Such a security system 104 may be implemented as a cloud of security service devices, and is sometimes referred to herein as a "remote security service" 104 or a "security service cloud" 104. In addition to components such as processors 108, network interfaces 110, and memory 112, the computing device 102 may implement a security agent 114, which is shown as being stored in the memory 112 and executable by the processor(s) 108. The security agent 114 may include one or more observation components 116 to observe events that occur on the computing device 102, an LRU-based event suppressor 118 to suppress events that are likely to contain redundant data, and a communications module 120 to communicate with the security service cloud 104, such as by sending events, and/or data relating thereto, with or without suppression to the remote security system 104. In addition to the security agent 114, the computing device 102 may include an operating system 122 and processes 124(1)-(M) executing on the computing device 102.

In various embodiments, the computing device 102 may include one or multiple computing devices, which may be distributed in different locations and communicatively coupled together. The computing device 102 may include one or more of a mainframe, a work station, a server, a personal computer (PC), a laptop computer, a tablet computer, a personal digital assistant (PDA), a cellular phone, a media center, an embedded system, or any other sort of computing or electronic device or devices. In some implementations the computing device 102 represents one or more virtual machines implemented on one or more computing devices.

In some embodiments, the network 106 may include any one or more networks, such as wired networks, wireless networks, and combinations of wired and wireless networks. Further, the network 106 may include any one or combination of multiple different types of public or private networks (e.g., cable networks, the Internet, wireless networks, etc.). In some instances, the computing device 102 and the remote security system 104 communicate over the network 106 using a secure protocol (e.g., https) and/or any other protocol or set of protocols, such as the transmission control protocol/Internet protocol (TCP/IP).

As mentioned, the computing device 102 includes a processor(s) 108 and a network interface(s) 110. The processor(s) 108 may be or include any sort of processing unit, such as a central processing unit (CPU) or a graphic processing unit (GPU). The network interface(s) 110 allows the computing device 102 to communicate with one or both of the remote security system 104 and other devices. The network interface(s) 110 may send and receive communications and/or data through one or both of the network 106 or other networks. The network interface(s) 110 may also support both wired and wireless connection to various networks.

The memory 112 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other non-transitory computer-readable medium which can be used to store the desired information and which can be accessed by a computing device.

As mentioned, the memory 112 includes a security agent 114. In some embodiments, the security agent 114 operates as a virtual machine/shadow operating system, and may execute at least partially in the kernel mode of the computing device 102. The kernel mode and user mode of the computing device 102 correspond to protection domains—also known as rings—that protect data and functionality of the computing device 102 from faults and malware. Typically, the user mode is associated with the outermost ring and the least level of privileges to access memory and functionality, while the kernel mode is associated with an inner ring (sometimes the innermost ring, although in modern computing devices there is sometimes an additional level of privilege) and a higher level of privileges, as compared to the user mode, to access memory and functionality, including operating system 122 processes. The security agent 114 may load before the operating system 122 of the computing device 102, such as by loading very early in the boot-time of the computing device 102 (e.g., the security agent 114 may load within the first few dozen instructions upon booting the computing device 102). By loading early in boot-time, the security agent 114 can significantly reduce the window in which malware can become active and interfere with operation of the computing device 102 or run unobserved on the computing device 102.

In various embodiments, the security agent 114 may be installed on the computing device 102 in the form of a driver and may be received from the remote security system 104. The security agent 114 may interact with the remote security system 104 for security purposes, such as detecting malicious activity/software on the computing device 102. These interactions between the security agent 114 and the remote security system 104 enable a detection loop that defeats the malware update loop of malware developers (also referred to herein as "adversaries") and further enable the security agent 114 to perform updating while continuously monitoring, eliminating dangerous gaps in security coverage. Part of this detection loop may include proactively sending observed events 115 to the remote security system 104, with or without suppression, as described in further detail herein.

As illustrated in FIG. 1, the security agent 114 includes observation components 116 to observe events 115 associated with one or more processes 124 executing on the computing device 102. Events 115 may include both actions performed by processes 124 and non-occurrence of expected actions. For example, the observation components 116 may receive notifications of the occurrence or non-occurrence of events 115, such as, without limitation, process creation events, end of process events, domain name system (DNS) queries, file creates, reads and/or writes, and/or loading executables, rendering events (e.g., output of graphics on a display screen, printer, etc.). Although examples are discussed herein primarily with reference to process creation events, it is to be appreciated that the techniques and systems described herein can be utilized to identify, isolate, and suppress any type of event 115 known to a person having ordinary skill in the art now or in the future.

A process creation event 115 is a type of event 115 that can be proactively sent to the remote security system 104 for security purposes. A process creation event 115 may occur any time a program is executed on the computing device 102, whether the program execution occurs automatically or in response to a user input action. For example, when a user of the computing device 102 double clicks on a program (e.g., Adobe Reader® program), the program may be initialized by a process 124(1) (e.g., a process such as explorer.exe, on Windows® platforms), and a process creation event 115 can be correlated with the initialization/creation of this process 124(1). This process 124(1), which may be a root process 124(1), can spawn, or create, one or more sub-processes 124, and thereby, the process 124(1) may become a parent process 124(1) to one or more child processes 124. Additionally, or alternatively, additional root processes 124 can be created as part of executing the same or different programs. As such, the processes 124 that execute on the computing device 102, and their corresponding events 115 (e.g., process creation events) can be thought of in terms of a process tree (or event tree), with parent-child relationships between pairs of processes 124 (or events 115) in the process tree (or event tree).

The observation component(s) 116 may observe events 115 associated with processes 124 in various ways. For example, the observation component(s) 116 may register with a hook or filter driver offered by the operating system 122, and/or other monitors in user mode or kernel mode to receive notifications of semantically-interesting events 115. The observation component(s) 116 may also monitor locations in memory 112 or log files, or spawn a thread to do so, for observing events 115 associated with the log files or memory locations. The types of events 115 observed by the observation component(s) 116 may be specified by a configuration of the security agent 114. In some embodiments, the observation component(s) 116 observe all events 115 on the computing device 102 and the LRU-based event suppressor 118 effectively filters the events 115 based at least in part on rate-based statistics associated with the observed events 115 pursuant to the grouping schemes defined by the LRU-based event suppressor 118, as described in further detail below.

FIG. 1 shows the LRU-based event suppressor 118 as including multiple, independently-operating suppression correlators 126(1), 126(2), . . . , 126(N) (collectively suppression correlators 126), each suppression correlator 126 being configured to implementing an associated LRU-based event suppression through the use of LRU tables, as discussed in further detail below with respect to the following figures. The use of multiple suppression correlators 126 allows for an efficient, flexible, and generic approach for identifying events 115 that are to be suppressed, and an approach that is extensible across different platforms. Each suppression correlator 126 implements an associated LRU table to provide a distinct way of grouping events 115 into event groups, which is often referred to herein as a "grouping scheme". Grouping schemes can be defined in a general and flexible manner to allow for the number "N" of suppression correlators 126 to be minimized, which reduces the processing and storage resource consumption under "normal" circumstances. That said, the disclosed LRU-based approach to event suppression is highly extensible by virtue of a configurable set of "N" suppression correlators 126 that can be used to define any number of grouping schemes for use in identifying (and suppressing, when necessary) the most frequent events across all definable event groups.

In some instances, the computing device 102 may have features or functionality in addition to those that FIG. 1 illustrates. For example, the computing device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within any or all of the computing device 102 may reside remotely from that/those device(s), in some implementations.

FIG. 2 illustrates example LRU tables 200(1), 200(2), 200(3), 200(4), . . . , 200(N) (collectively 200) that can be implemented by corresponding suppression correlators 126 (1)-(N) in order to implement LRU-based event suppression, as described herein. The LRU tables 200 in FIG. 2 are shown with unpopulated fields so that the structure of the LRU tables 200 can be described. The fields of the LRU tables 200 may be unpopulated prior to observation of events 115. Although the term "table" is used to describe the LRU structure, it is to be appreciated that the term "table" can comprise any suitable type of data structure, such as a file, a table, a database, or the like, that can provide the functionality described herein with respect to the LRU tables 200. The structure of the LRU tables 200 will be described initially in FIG. 2, and then the use of the LRU tables 200 will be described in the following figures.

The first example LRU table 200(1) in FIG. 2 defines a first event grouping scheme 202(1) to classify observed events 115 into multiple event groups according to a particular set of event properties 204(1)(*a*), 204(1)(*b*), and 204(1)(*c*). A "grouping scheme" 202, as used herein, is a distinct way of grouping events 115 based on one or more categorization criteria, such as grouping events by common values among a defined set of event properties 204. Event properties 204 may comprise any suitable attributes, behaviors, patterns, or other descriptions of an event 115, or of a process 124 corresponding to the event 115. In this case, the grouping scheme 202(1) is defined by a set of event properties 204(1)(*a*)-(*c*) that include a parent process identifier (PPID) 204(1)(*a*), an Image File Name (IFN) 204(1)(*b*), and a Command Line (CL) 204(1)(*c*). A value of the PPID 204(1)(*a*) may indicate a particular parent process 124 that created the process 124 for the event 115 in question. A value of the IFN 204(1)(*b*) may indicate a particular program being executed by a process 124 associated with the event 115 in question. A value of the CL 204(1) may indicate a particular argument of the process 124 for the event 115 in question. These example event properties 204(1) may be contained in an event definition for a particular type of event 115. In this example, an event 115 may be a process creation event having an event definition with values for each of the set of properties 204(1)(*a*)-(*c*).

Thus, the grouping scheme 202(1) can be utilized to group events 115 into event groups based upon whether the events 115 share common values for the set of event properties 204 defined by the grouping scheme 202(1). In other words, for the LRU table 200(1), a unique set of values in the event property columns 204(1)(*a*)-(*c*) define an event group, such that LRU table 200(1) can maintain rate-based statistics for a number "P" of event groups, as shown by the positions 1-P in the position column 206(1). "P" defines the number of positions 206(1) in the LRU table 200(1) corresponding to a size of the LRU table 200(1). The size of the LRU table 200(1) is configurable such that "P" can represent any suitable number of positions 206(1). In some cases, "P" may be no greater than about 5 positions 206(1), which allows for tracking rate-based statistics with respect to 5 or fewer frequently-occurring events 115.

The LRU table 200(1) can be described as a cache of the P most recently observed event groups. When an event 115 is observed, an entry in the LRU table 200(1) is either created at, or moved to, the first position (position 1) in the LRU table 200(1). Whether the entry is created as a new entry at position 1 or an existing entry is moved to position 1 depends on whether the event's 115 values for the properties 204(1)(*a*)-(*c*) already exist in an entry of the LRU table 200(1), as described in more detail below with respect to the following figures. Thus, events 115 that are frequently inserted into the LRU table 200(1) tend to stay in the LRU table 200(1). Accordingly, the LRU tables 200(1) can be used as a mechanism to approximate the answer to the question "has event XYZ happened recently?" The LRU table 200(1) favors efficiency in terms of resource cost by not tracking all events 115, which would be an expensive way of answering, with 100% accuracy, the question "has event XYZ ever happened before?" Instead, only the most frequently occurring events 115 are maintained in LRU tables 200(1), which conserves resources on the computing device 102.

The LRU table 200(1) also includes a "count" column 208(1), which can be used to track a running count of the most recently-occurring events 115 classified in as many as "P" event groups. The description below, with respect to the following figures, will describe how the suppression correlator 126(1) associated with the LRU table 200(1) can operate on the count 208 values in the LRU table 200(1) to transform the counts into a rate-based statistic for the P event groups maintained in the table. From the perspective of the LRU table 200(1), however, each time an observed event 115 is inserted into the LRU table 200(1) the count is incremented in the entry at position 1 in the LRU table 200(1) having the event's property values in columns 204 (1)(*a*)-(*c*).

FIG. 2 shows other examples of LRU tables 200. Each of the LRU tables 200 may differ from other LRU tables according to one or more attributes of the tables. FIG. 2 shows that the grouping schemes 202 can vary between the LRU tables 200. The size of the LRU tables 200 can also vary such that the number of positions 206 that each LRU table 200 maintains for event entries can vary (i.e., values of "P", "Q", "R," and "S" can be different values).

In FIG. 2, the LRU table 200(2) defines a different set of event properties 204(2)(a) and 204(2)(b), which correspond to a second grouping scheme 202(2) that is different than the set of properties 204(1)(a)-(c) of the first grouping scheme 202(1) for the LRU table 200(1). In this case, the grouping scheme 202(2) defines a subset of event properties 204(1)(a)-(c) by excluding the Command Line (CL) property 204(1)(c) from the LRU table 200(2). Thus, the LRU table 200(2) defines a less granular grouping scheme 202(2) than the grouping scheme 202(1) with a higher granularity due to the additional Command Line (CL) property 204(1)(c). While a first suppression correlator 226(1) using the LRU table 200(1) may suffice for suppressing some events 115, there may be some event groups that are not maintained by the first LRU table 200(1), yet these event groups may be maintained by the second LRU table 200(2), which may be due, at least in part, to the different grouping scheme 202(2) of the LRU table 200(2). For instance, high frequency process creation events 115 may share many common property values, yet these events 115 may vary exclusively in the Command Line (CL) field 204(1)(c). Such high frequency process creation events 115 may trigger event suppression using the second LRU table 200(2) but not the first LRU table 200(1). Thus, the varying LRU tables 200 can allow for a layered approach to LRU-based suppression with an LRU table 200, such as the LRU table 200(2), to act as a fallback mechanisms for identifying high frequency events 115 that may be missed by the other LRU tables 200.

The LRU table 200(3) shows yet another example of a different grouping scheme 202(3) for identifying frequently-occurring events 115. This grouping scheme 202(3) groups events exclusively based on PPID 204(3)(a) and a user identifier (ID) 204(3)(b), which may identify a user who started a process 124.

The LRU table 200(4) shows yet another example of a different grouping scheme 202(4) for identifying frequently-occurring events 115. This grouping scheme 202(4) groups events exclusively based on PPID 204(4).

The LRU table 200(N) shows yet another example of an LRU table 200 that is "dimensionless" in that it does not define any event properties 204 for grouping events 115. This can be thought of as a grouping scheme 202 that groups "all events," or it can be thought of as an LRU table 200(N) that does not define a grouping scheme 202. Either way, the LRU table 200(N) simply maintains the count 208 for all observed events 115. This may act as a final layer of defense, or catch all approach to triggering event suppression when all other suppression correlators 126(1)-(N–1) fail to trigger event suppression.

The LRU tables 200 shown in FIG. 2 can be viewed holistically as an approach to identifying and isolating frequently-occurring events with a layered, or hierarchical approach that. Although multiple LRU tables 200, such as those shown in FIG. 2, may be utilized, it is to be appreciated that the systems and techniques described herein can utilize any suitable number of LRU tables 200 for event suppression, such as a single LRU table 200, or multiple LRU tables 200 (e.g., two, three, four, etc.). In the multi-LRU table case, although which suppression correlator 126 will be triggered first depends on the sequence of observed events, it may be very likely that event suppression is triggered for an event group maintained by highly granular LRU table 200(1) before suppression is triggered for event groups in the less granular LRU tables 200(2)-(N), shown in FIG. 2. As will be described in further detail below, ongoing suppression can be reported to the remote security system 104, and the layered approach depicted by the LRU tables 200 in FIG. 2 may allow for such reports to include as much detail as possible regarding the events 115 that are being suppressed. For instance, if the suppression correlator 126(1) that uses the LRU table 200(1) triggers event suppression more often and/or before suppression is triggered by other correlators 126(2)-(N), the security agent 114 can report details regarding the set of three event properties (e.g., PPID, IFN, and CL) to the remote security system 104, which may be preferred over a subset of event properties that can be reported by the suppression correlators 126(2)-(N).

Figure 3:
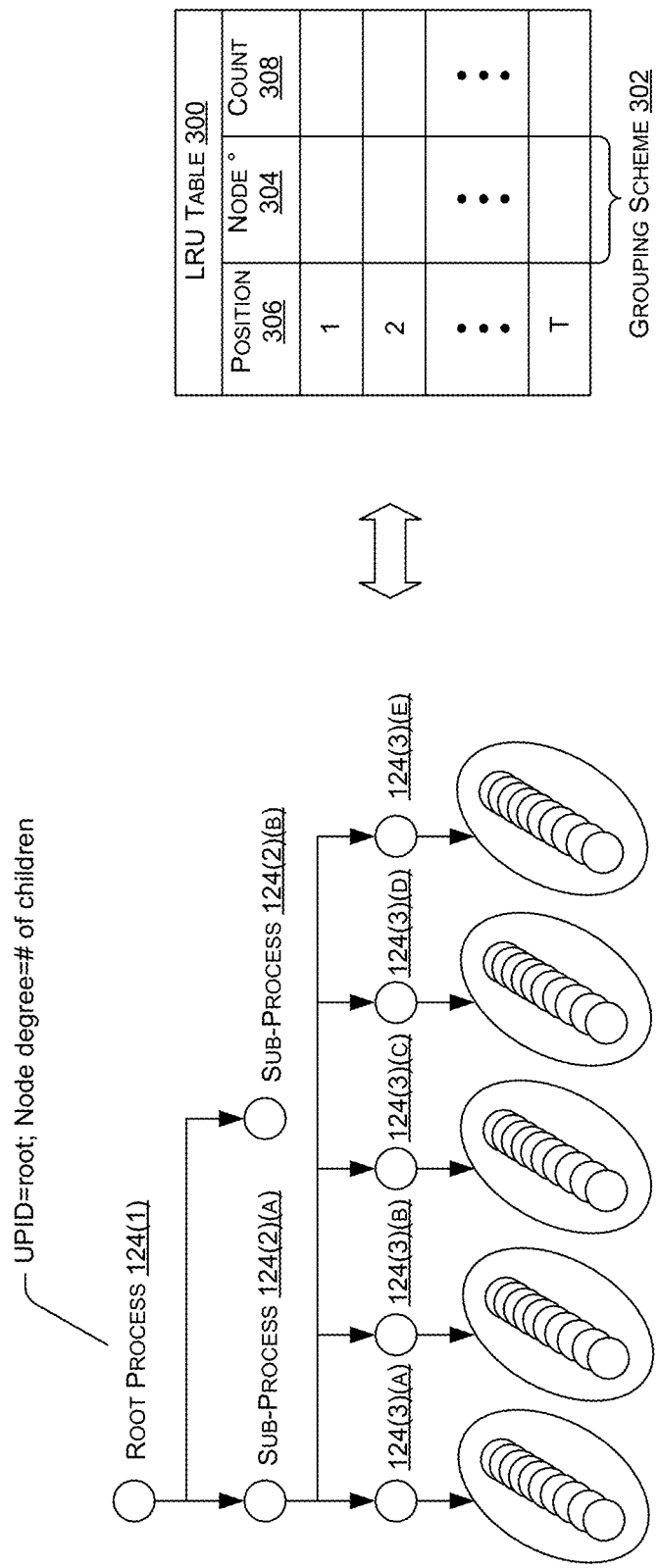
FIG. 3 is a schematic diagram of a fallback grouping scheme that can be used for another example LRU table implemented by a suppression correlator.

FIG. 3 is a schematic diagram of a fallback grouping scheme 302 that can be used for another example LRU table 300 implemented by a suppression correlator 126. The grouping scheme 302 defined by the LRU table 300 provides an efficient (e.g., small, constant overhead per process creation event 115) strategy for identifying the lowest root of process subtrees where significant process 124 creation is occurring. The grouping scheme 302 also addresses a "deep tree" case, and a "frequent small trees" case that may not be addressed by the heretofore described example LRU tables 200. In the "frequent small trees" case, a single parent process 124 may repeatedly create small subtrees, each perhaps on the order of a dozen or so processes 124. If each subtree has something like ten processes 124, for example, a typical "wide tree" grouping scheme may exclusively "see" the root of each subtree, and so the cost of the subtree will appear to be $\frac{1}{10}^{th}$ its actual cost on the basis of that grouping scheme. Thus, the grouping scheme 302 is devised to identify the appropriate root process 124 of a subtree where many process creation events 115 are occurring at a high frequency, and to use that root process 124 as the index for all sub-processes 124. The grouping scheme 302 shown in FIG. 3 can also ensure that, for every process 124 created on the computing device 102, a useful common root ancestor process 124 can be identified that a) is not the actual root (e.g., 'init') process 124, and b) is as closely situated in the process tree to the prolific process creation as possible.

In Graph Theory, the node degree represents a number of edges from a given vertex/node of the graph. In the case of process 124 trees, the node degree can represent the number of child processes 124 a given process 124 has created. FIG. 3 shows a technique of propagating "highest" node degree information from parent to child processes 124, so that every created process 124 has enough information to determine the subtree to which the process 124 belongs. Each process creation event 115 may cause the following pieces of information to be propagated from parent to child: (i) a Process ID root; and (ii) Current Node Degree (# of children) of that root.

When the very first (root) process 124(1) creates its first child process 124(2)(a), the root process 124(1) propagates two pieces of information to the child process 124(2)(a): (i) the Universal Process Identifier (UPID) of the root process 124(1) ("universal," in this context, means unique across all processes 124 on the computing device 102), and (ii) the current node degree of the root process 124(1), which is "1" at this point in time. When the root process 124(1) creates its second child process 124(2)(b), the root process 124(1) propagates two pieces of information to the child process 124(2)(b): (ii) the UPID of the root process 124(1), and (ii) the current node degree of the root process 124(1), which is "2" at this point in time. This can continue for any number of sub-processes 124(2) that are one level from the root process 124(1), and, therefore, the root process 124(1) will create its $n^{th}$ child with node degree "n".

Suppose the root's 124(1) first created child process 124(2)(a) (call it process "A") creates five child processes 124(2)(a)-(e), sequentially. When process "A" 124(2)(a) was created, it was created with UPID=root and Highest Node Degree=1. When process "A" 124(2)(a) creates its first child process 124(3)(a), the node degree of process "A" 124(2)(a) is equal to the highest node degree between its own node degree and the node degree that was propagated to process "A" 124(2)(a) by its parent, the root process 124(1). Therefore, process "A" 124(2)(a) re-propagates (or forwards) UPID=root and Highest Node Degree=1 to its first child process 124(3)(a). When process "A" 124(2)(a) creates its second child process 124(3)(b), however, the node degree of process "A" 124(2)(a) is now 2, which is higher than the (highest) node degree that was propagated to process "A" 124(2)(a). Thus, process "A" 124(2)(a) propagates to its second child process 124(3)(b): (i) UPID=A (i.e., the UPID corresponding to process "A" 124(2)(a)), and (ii) Highest Node Degree=2. Process "A" 124(2)(a) then propagates UPID=A and Highest Node Degree=3 to its third child process 124(3)(c), and so on, until the last process 124(3)(e), in this example.

Now suppose that each child process 124(3) of process "A" 124(2)(a) ends up being the root of a subtree that contains ten processes 124(4). As process "A" 124(2)(a) creates more trees, the processes 124 in those trees will have larger "Highest Node Degree" values propagated to them. The $100^{th}$ subtree of process "A" 124(2)(a), for example, will have Highest Node Degree=100 propagated to the processes 124 in that $100^{th}$ tree, and each process 124 will identify UPID=A as the root of that $100^{th}$ tree.

In this way, each process 124 that is created will have identified a root process 124 based on the propagated values described with reference to FIG. 3. New roots will only be identified when some descendant process 124 has spawned more child processes 124 (potential tree roots) than any of its ancestors. In addition, since the information is only propagated one step on each process creation event 115, propagation of the information is very efficient, with two pieces of data propagated for each process creation event 115.

Identifying high degree nodes provides a way to group process creation events 115 based on a shared ancestor of a process subtree. The root of each subtree can be used as the index to the LRU 300 so that each process creation event 115 can be grouped based on the subtree to which it belongs. The LRU table's 300 grouping scheme 302, which is based on the "Node Degree" 304, reflects this approach. Grouping events 115 this way provides a grouping scheme 302 that addresses not just repeated trees, but deep trees as well. Suppose the root process 124(1) creates process "A" 124(2)(a), which creates a sub-process 124 (call it process "B"), which creates a sub-process 124 (call it process "C", and so on, for an indefinite number of sub-processes 124. The node degree of all of these processes 124 is 1, using the propagation approach described herein, and the identified root of this example tree is the root (init) process 124(1). This type of deep tree can contain many processes 124 with a small Highest Node Degree value ("1" in this case) by being a deep tree. Now, if one of the sub-processes 124, such as process "A" 124(2)(a), had created some extra dangling sub-process 124 before continuing the deep tree, as is the case shown in FIG. 3, that sub-process 124 (e.g., process "A" 124(2)(a)) would become the highest degree node with a node degree of 2, and the descendants of that process "A" 124(2)(a) would identify process "A" 124(2)(a) as their root, and the Highest Node Degree value propagated down the process chain would be "2".

The natural effect of this propagation process for identifying subtrees is that it becomes increasingly difficult over time for lower level descendant processes 124 to identify themselves as "new" roots, since ancestors are older and will, over time, tend to either have a small, constant node degree (which means some persistent descendant will tend to get identified as the root), or their degree will increase over time, causing them to maintain their root status.

Figure 4A:
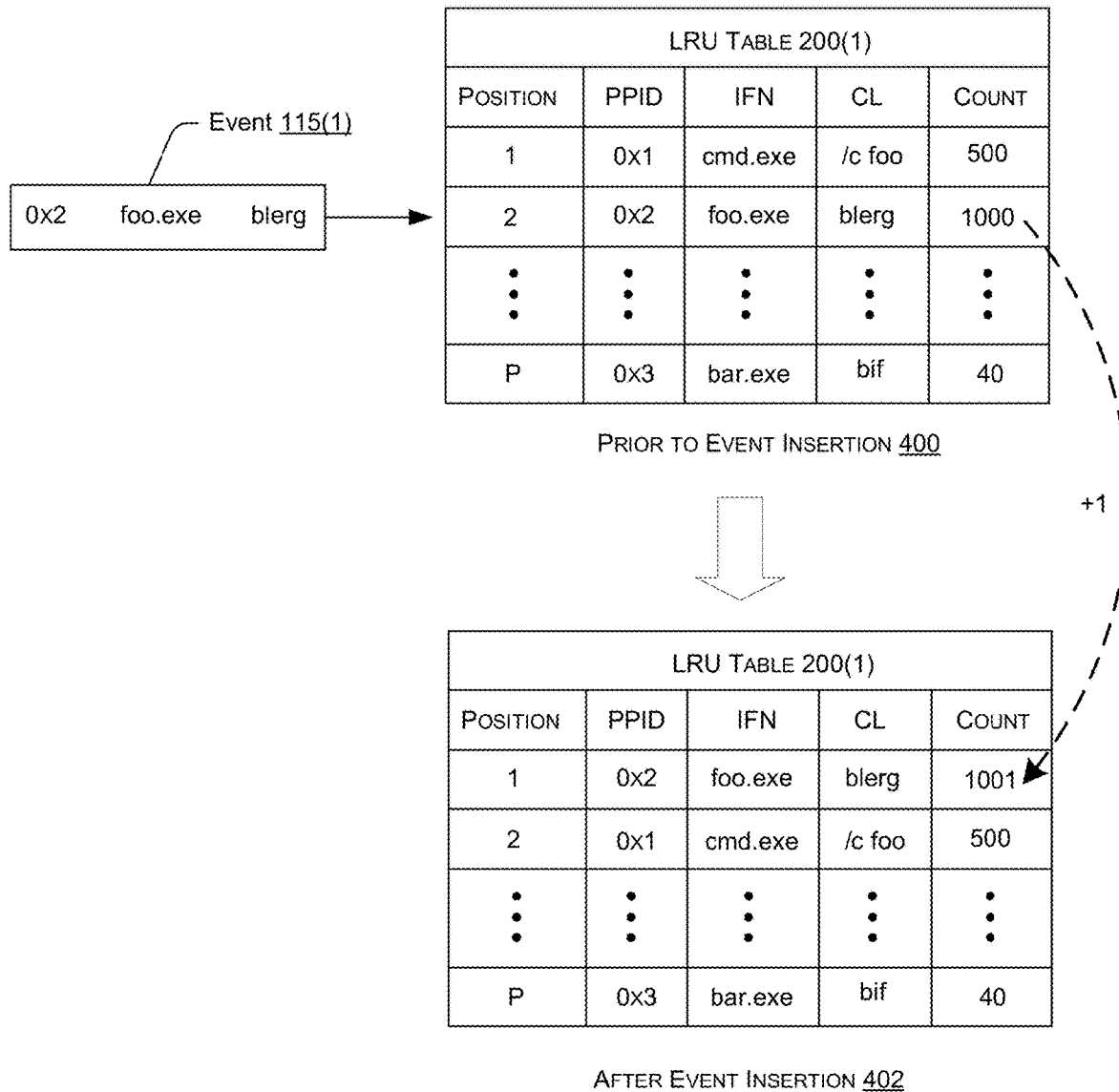
FIG. 4A is a schematic diagram showing how events are inserted into an LRU table in a cache hit scenario.

FIG. 4A is a schematic diagram showing how events 115 are inserted into an LRU table 200 in a cache hit scenario. Assume, for the LRU table 200(1) in FIG. 4A, that the LRU table 200(1) is populated with recent events 115 (organized by event groups in which those events 115 are classified) that have been observed on the computing device 102. The LRU table 200(1) operates like an eviction policy such that, when a new event 115(1) is observed and inserted into the LRU table 200(1), a lookup is performed against the LRU table 200(1) to see if the property values of the event 115(1) match any set of property values already in the LRU table 200(1) (i.e., a cache hit scenario). FIG. 4A illustrates a cache hit scenario where the values (PPID=0x2; IFN=foo.exe; and CL=blerg) of the event 105(1) matches the property values of the entry at position 2. An instance of the LRU table 200(1) at a time prior to insertion of the event 115(1) is shown by the reference numeral 400 in FIG. 4A, where the entry at position 2 includes a set of property values that match the property values of the event 115(1) being inserted. These property values define an event group for the event 115(1) so that other vents 115(1) with the same property values can be grouped together. The cache hit scenario shown in FIG. 4A causes the entry at position 2 prior to event insertion to be moved to the top (i.e., position 1) of the LRU table 200(1), and the entries above position 2 are moved down in the LRU table 200(1) to the next lower position. An instance of the LRU table 200(2) at a time after insertion of the event 115(1) is shown by reference numeral 402 of FIG. 4A. This shows how the entry at position 1 corresponds to the most recently observed/inserted event 115(1) with a particular set of property values defined in the table's grouping scheme. The count at position 1 is also incremented upon the insertion of the event 115(1). It is worth noting that a cache hit scenario may involve event properties that match the property values of the entry at position 1 prior to event insertion, which would not cause any of the entries to move positions in the LRU table 200(1). However, insertion of an event 115 in this specific cache hit scenario would still cause the count of the entry at position 1 to increment.

Figure 4B:
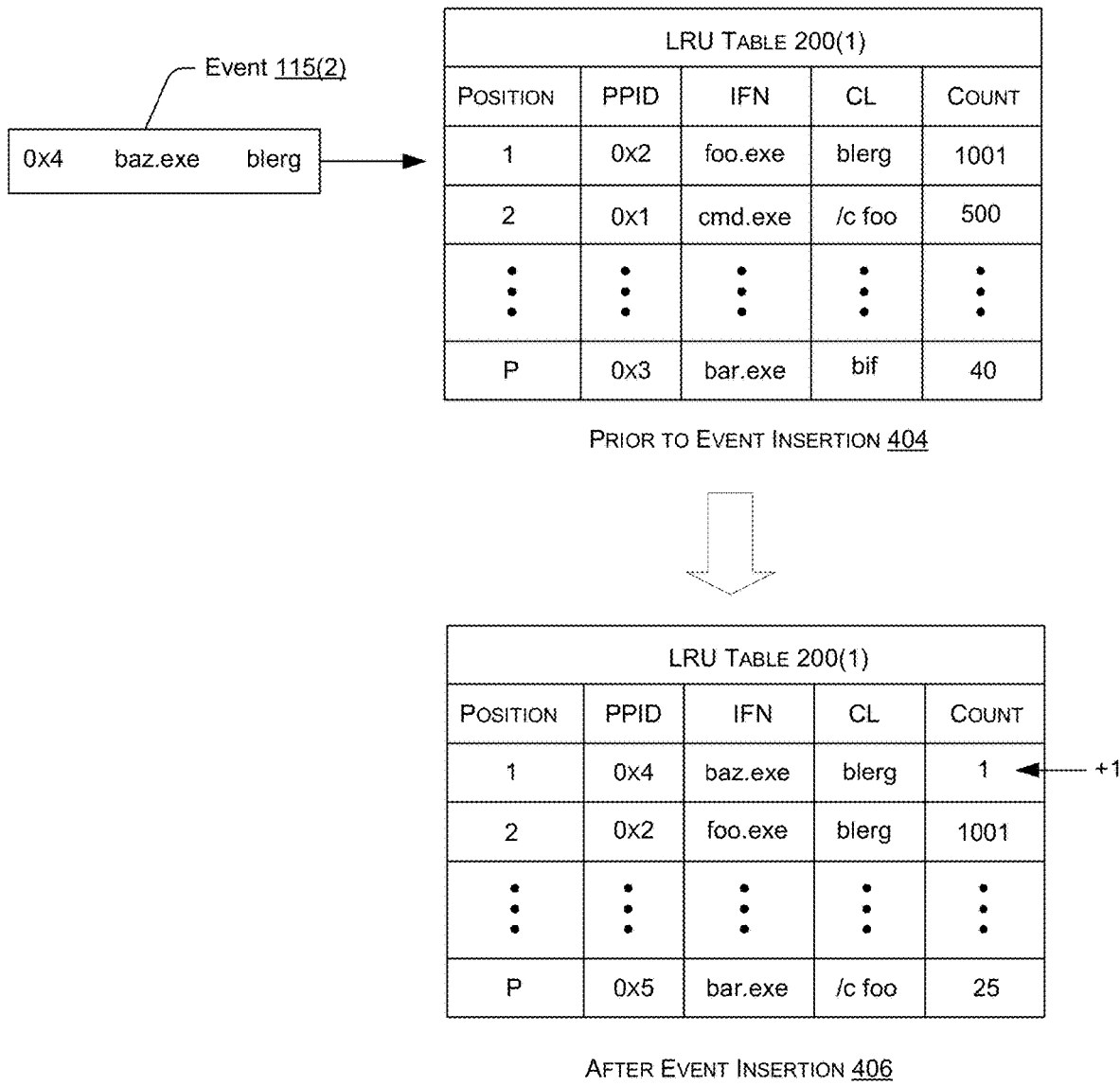
FIG. 4B is a schematic diagram showing how events are inserted into an LRU table in a cache miss scenario.

FIG. 4B is a schematic diagram showing how events 115 are inserted into an LRU table 200 in a cache miss scenario. For example, if a new event's 115(2) property values do not match any of the existing property values in entries 1-P of the LRU table 200(1), as shown in the instance at reference numeral 404 in FIG. 4B, the new event 115(2) is inserted into the LRU table 200(1) at position 1, and the remaining entries are moved down by one position such that the last entry "P" is evicted from the LRU table 200(1), and the count information with respect to the evicted event group is lost (i.e., the LRU table 200(1) stops tracking count values for evicted event groups). Thus, the manners of inserting events 115 into LRU tables 200, as shown in FIGS. 4A and 4B means that, as additional events 115 are observed and inserted into the LRU table 200(1), the most recently observed events 115 stay at the top of the LRU table 200(1) in either the cache hit or cache miss scenarios. The disclosed LRU-based approach to tracking events 115 allows for not keeping track of all events 115; just the most recently occurring events 115. These most recently occurring events 115 are likely to be the events 115 that are to be suppressed. The size of the LRU table 200 can be configured appropriately for the number of recently occurring events 115 that are to be tracked.

Figure 5:
FIG. 5 is a schematic diagram showing values that can be used in a rate detection algorithm with respect to two different suppression correlators.
Figure 5:

FIG. 5 is a schematic diagram showing values that can be used in a rate detection algorithm with respect to two different suppression correlators 126(1) and 126(2). Events 115, as they are observed, can be inserted into the LRU tables 200(1) and 200(2) shown in FIG. 5, causing each LRU table 200(1) and 200(2) to maintain a frequently-occurring subset of the observed events 115 according to each table's grouping strategy 202. Furthermore, the count value of the event's 115 entry is incremented upon insertion of the event, such that the count values of corresponding entries continue to increment as events 115 are inserted.

However, rather than simply aggregating a total count over time in the count field, the suppression correlators 126(1) and 126(2) are configured to implement a rate detection algorithm that operates (in a mathematical sense) on the count values in their respective LRU tables 200(1) and 200(2), which transforms the count values into values of a rate-based statistic, such as frequency. This may be accomplished by iteratively subtracting a predetermined value (referred to as a "subtraction value" in FIG. 5) from the count value of each entry at a predetermined time interval (referred to as a "subtraction interval" in FIG. 5). The predetermined subtraction values and subtraction intervals can vary between suppression correlators 126. For example, the suppression correlator 126(1) may use a subtraction value of 100 and a subtraction interval of 1 second so that a value of 100 is subtracted from the count of each entry in the LRU table 200(1) every second. In this example, the suppression correlator 126(1) basically allows 100 events per second "for free", i.e., before additional events above the 100 events per second begin to increment an accumulated count value that increases toward an upper threshold, which is sometimes called the "bounding threshold."

Consider, in the LRU table 200(1) of FIG. 5, that events 115 in the event group having the property values PPID="0x3", IFN="bar.exe", and CL="bif"—currently at position "P" in the LRU table 200(1)—occur at a frequency of 100 events per second. Although the position of the entry for this event group may change within the table 200(1) while events 115 are observed, as long as the entry for this event group is maintained in the LRU table 200(1), the count value would increase to 100 and revert back to a value of 0, every second.

Meanwhile, consider, in the same example scenario, that events 115 in a second event group having the property values PPID="0x2", IFN="foo.exe", and CL="blerg"—currently at position "2" in the LRU table 200(1)—occur at a frequency of 110 events per second. Again, the position of the entry for this event group in the LRU table 200(1) may change while events 115 are observed, but as long as the entry for this second event group is maintained in the LRU table 200(1), the count value would, over time, increase because the frequency of 100/s (defined by the subtraction value of 100 and the subtraction interval of 1 second) is less than the event frequency of 110/s. Specifically, the count value would equal 100 after a time period of 10 seconds, starting from a count value of 0, or 10 additional events per second for 10 seconds.

The suppression correlator 126(2) is shown as using a different subtraction value of 200 and a subtraction interval of 1 second. Thus, the suppression correlator 126(2) would subtract a value of 200 from the count values in the LRU table 200(2) for each entry every second. Of course, the subtraction interval could be any suitable interval, such as every few seconds, every minute, every few minutes, and so on for any suitable unit of time.

Now that the count has been transformed into a rate-based statistic through iterative subtraction of predetermined values from the count values at predetermined time intervals, this rate-based statistic can be monitored on a frequent periodic basis against an upper threshold that is used to trigger event suppression. For example, the suppression correlator 126(1) of FIG. 5 uses an upper threshold of 1000. In the example shown in FIG. 5, upon comparing the values in the count column of the LRU table 200(1) to the upper threshold of 1000, the suppression correlator 126(1) can determine whether any of the values exceed the upper threshold of 1000. Upon exceeding this upper threshold, the suppression correlator 126(1) can trigger suppression of events in the event group corresponding to the entry where count column value exceeds the upper threshold. In the running example shown in FIG. 5, events 115 in the event group at position "2", having the property values PPID="0x2", IFN="foo.exe", and CL="blerg", would be suppressed by the suppression correlator 126(1), such as by causing the communications module 120 to refraining from sending, to the remote security system 104, at least some of the observed events 115 that are classified in this event group.

After suppression is triggered for an event group, the value in the count column of the LRU table 200(1) may be monitored to determine if and when the count falls below a lower threshold. In the example of FIG. 5, the lower threshold for the suppression correlator 126(1) is set to 500. Thus, as soon as the value in the count column at position 2 falls below the lower threshold of 500, event suppression may be ceased for this event group, which causes the communications module 120 to send events 115 classified in the event group without suppression.

FIG. 5 shows how a different suppression correlator 126(2) may use a different upper and lower threshold values in its rate detection algorithm. This allows for configuring suppression correlators 126 to trigger and cease suppression at different threshold levels, for the purpose of hysteresis— the same reason that temperature control systems allow moderate fluctuations in temperature before toggling on or off a heating or cooling source. This is just one of the ways that each suppression correlator 126 operates independently from the other correlators 126. The holistic effect is to have multiple suppression correlators 126 that trigger suppression at different times, under different circumstances, and for different event groups.

The processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
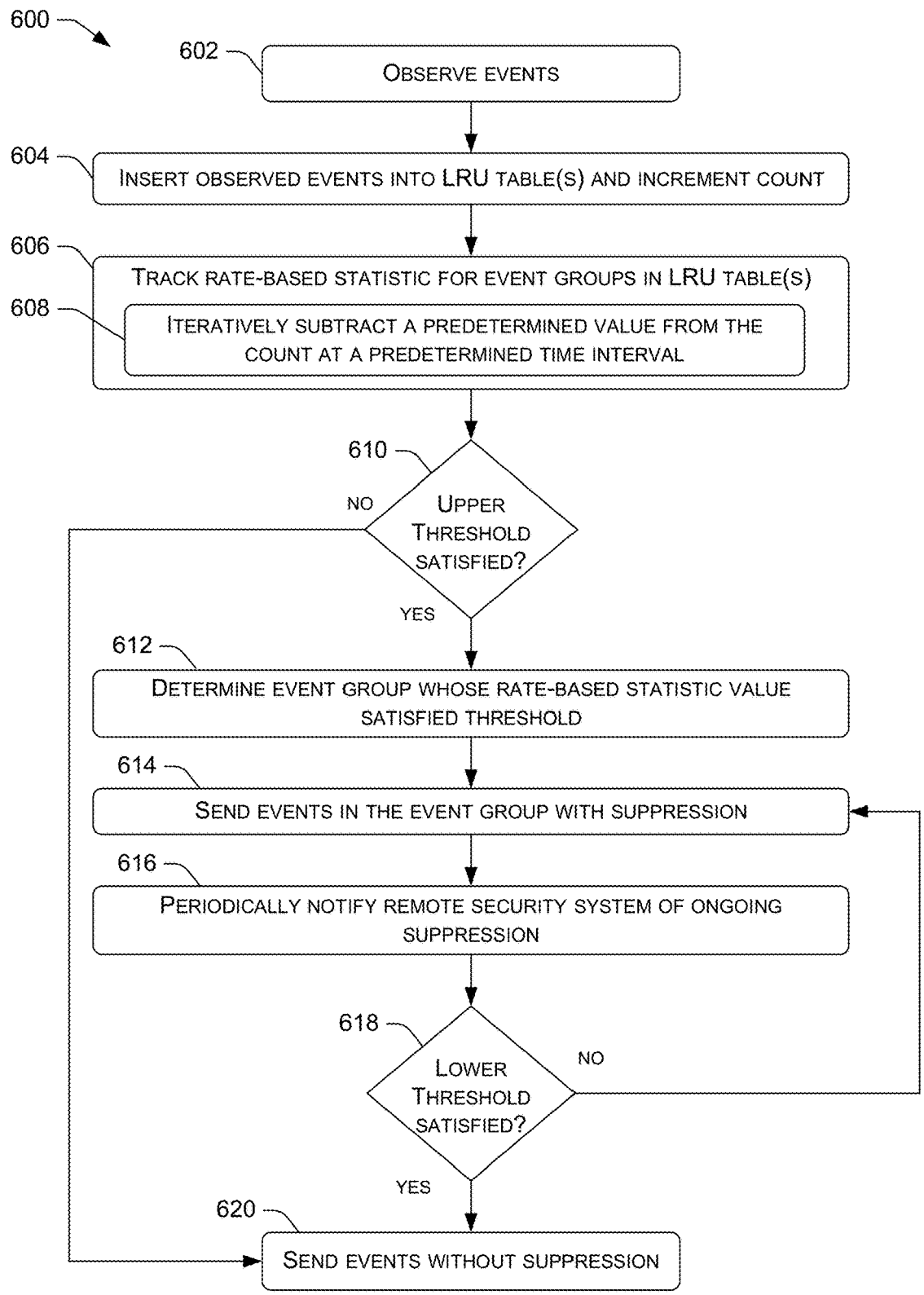
FIG. 6 illustrates an example process for triggering and ceasing suppression of events using an LRU-based approach to rate detection.

FIG. 6 illustrates an example process 600 for triggering and ceasing suppression of events 115 using an LRU-based approach to rate detection. By way of example, and not limitation, the process 600 is described with reference to the previous figures.

At 602, an observation component(s) 116 of the security agent 114 executing on a computing device 102 may observing events 115 as observed events. These observed events 115 may be associated with processes 124 executing on the computing device 102. For example, the observed events 115 may correspond to process creation events 115.

At 604, the LRU-based event suppressor 118 may receive the observed events from the observation component(s) 116, and may insert the observed events 115 into one or multiple LRU tables 200, as described herein. A count in the LRU table 200 for an entry corresponding to the inserted event 115 may be incremented each time an observed event 115 is inserted into the LRU table 200. The suppression correlator 126 associated with this LRU table 200 may operate (mathematically) on the count value so that the LRU table 200 can be used to track, for a subset of the observed events 115 maintained in the LRU table 200, a rate-based statistic for multiple event groups in which the subset of the observed events 115 are classified in the LRU table 200.

At 606, the suppression correlator(s) 126 associated with the LRU table(s) 200 can track the rate-based statistics maintained in the LRU table(s) 200. As described herein, this may be accomplished by performing a sub-step at block 608 to iteratively calculate the value of the rate-based statistic for a given event group by iteratively subtracting a predetermined value ("subtraction value") from the count in the entry for that group at a predetermined time interval ("subtraction interval"). This transforms the count into a rate-based statistic in the LRU table 200.

At 610, the suppression correlator(s) 126 may determine whether a value of the rate-based statistic for an event group in the associated LRU table(s) 200 satisfies a threshold(s) (e.g., upper threshold(s)) associated with the LRU table(s) 200. For a given suppression correlator 126 and LRU table 200, this may involve monitoring the value of the rate-based statistic for an event group as the value is iteratively calculated, and determining whether the value of the rate-based statistic for the event group, after an iterative calculation, exceeds the threshold associated with the LRU table 200. If the threshold is not satisfied at block 610, the process 600 follows the "no" route from block 610 to block 620 where the observed events 115 are sent, via the communications module 120, to a remote security system 104, without the suppression. If, however, the threshold is satisfied at block 610, the process 600 follows the "yes" route from block 610 to block 612.

At 612, the suppression correlator 126 may determine which event group defined by the grouping scheme 202 of the LRU table 200 satisfied the threshold. The event group can be defined in terms of a set of property values for the set of property values in the LRU table 200.

At 614, the suppression correlator 126 may send, via the communications module 120, the observed events 115 that are classified in the event group determined at block 612 to the remote security system 104 with suppression. In some embodiments, event suppression is implemented by including a field in the event definition that indicates the event 115 is not to be sent to the remote security system 104. Thus, security agent 114 may, at block 614, refrain from sending, to the remote security system 104, at least some of the observed events 115 that are classified in the event group that triggered suppression.

At 616, as long as suppression is still ongoing, the security agent 114 may send, after a period of time since initiating the suppression, a notification to the remote security system 104 indicating that the suppression is still ongoing. Such a notification may include information regarding an event grouping scheme 202, as defined by the LRU table 200, and the property values of the event group being suppressed. This may inform the remote security system 104 as to the basis of the suppression, and the information may be utilized for diagnostic purposes and/or telemetry purposes.

At 618, the suppression correlator 126 for which suppression was triggered may continue to monitor the rate-based statistic for the suppressed event group in the LRU table 200, and determine whether the value of the rate-based statistic for the event group, after each additional iterative calculation, satisfies a second threshold (e.g., lower threshold) associated with the LRU table 200. The second threshold evaluated at 618 may be less than the first threshold evaluate at 610. If, after an additional iterative calculation at block 618, the value of the rate-based statistic for the event group is determined to be less than a second, lower threshold associated with the LRU table 200, the process 600 follows the "yes" route from block 618 to block 620, where suppression is ceased, and the events 115 classified in the event group, which were formerly under suppression, are sent to the remote security system 104 without the suppression. Otherwise, if the value of the rate-based statistic does not fall below the second, lower threshold at block 618 after suppression has been initiated, the process 600 iterates by following the "no" route from block 618 back to block 614, where the suppression is continued for the event group in question.

Of course, it is to be appreciated that the process 600 may iterate as additional events are observed so that suppression correlators 126 are activated and deactivated according to event frequencies observed via the LRU tables 200. Furthermore, it is to be appreciated that the process 600 can operate with any number "N" of suppression correlators 126 and LRU tables 200, in parallel. As such, the determination at 610 may trigger suppression for a first suppression correlator 126(1) and cause the process 600 to perform blocks 612-618 until suppression is ceased for the particular event group, and, in parallel, or at a different time, suppression may be triggered for a second suppression correlator 126(2), causing the process 600 to perform blocks 612-618 for the second suppression correlator 126(2) independently from the first suppression correlator 126(1). As described herein, these different suppression correlators 126 may implement different LRU tables 200 that define different grouping schemes 202 by virtue of a defined set of event properties in the LRU tables 200.

Figure 7:
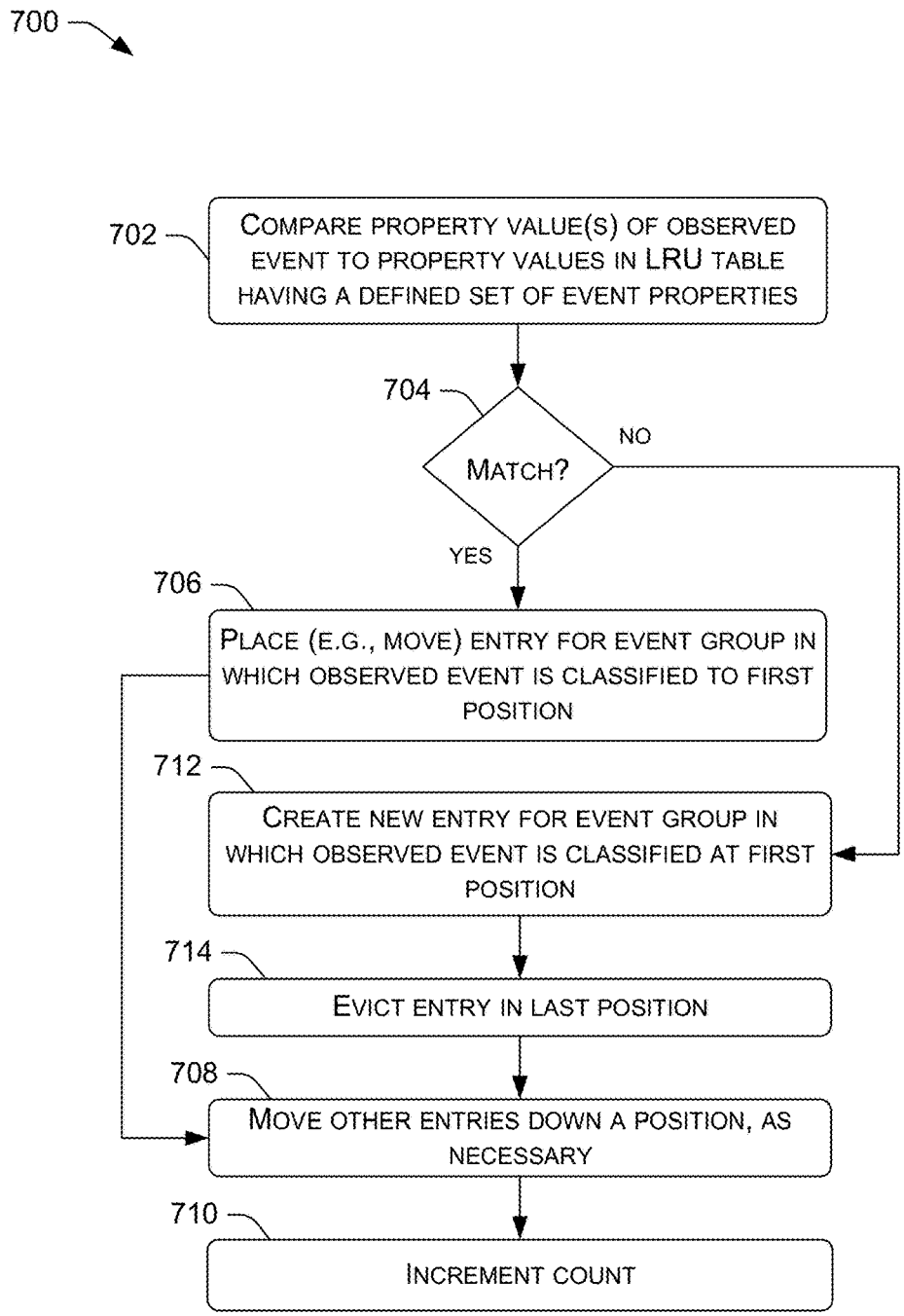
FIG. 7 illustrates an example process of inserting events into an LRU-table.

FIG. 7 illustrates an example process 700 of inserting events 115 into an LRU-table. By way of example, and not limitation, the process 700 is described with reference to the previous figures. The process 700 may represent a sub-process of block 604 of the process 600, which involves inserting observed events 115 into an LRU table(s) 200.

At 702, one or more property values of an observed event 115 may be compared to property values of previously-observed events 115 that are maintained in the LRU table 200. For example, the LRU table 200 may include entries for observed events in particular event groups defined by different property values for a set of property values that include, for example, a PPID, an Image File Name, and a Command Line. These property values of the observed event 115 can be compared to the values that exist in the LRU table 200 at block 702.

At 704, a determination is made as to whether the one or more property values of the observed event 115 match one or more property values among those that are maintained in the LRU table 200. If there is a matching set of property values (a cache hit), the process 700 follows the "yes" route from block 704 to block 706.

At 706, in response to finding matching property values in the LRU table 200, the existing entry for the event group with those matching property values is moved from an existing position in the LRU table 200 to the first position (position 1) in the LRU table 200. It is to be appreciated that, if the matching entry is already at position 1, the entry is not moved to a new position, but is effectively maintained in position 1.

At 708, other entries in the LRU table 200 may be moved down one position by virtue of the entry for the inserted event 115 being moved to the top/first position in the LRU table 200. Again, if the matching property values are already in the first position, there may be no movement of entries within the LRU table 200. Furthermore, entries below a matching entry may not move at all when an event 115 is inserted into the LRU table 200.

At 710, a count may be incremented in the entry at position 1 for the event group in which the inserted event 115 is classified. If, at block 704, it is determined that the property value(s) of the to-be-inserted event 115 do not match any of the property values maintained in the LRU table 200, the process 700 follows the "no" route from block 704 to block 712.

At 712, a new entry may be created for an event group having the property value(s) of the observed event 115 at the first position in the LRU table 200.

At 714, the last entry in the LRU table 200 is evicted from the table, and its rate-based statistic information lost as a result. The process 700 then proceeds from block 714 to block 708, where other entries in the LRU table 200 are moved down one position by virtue of the new entry for the inserted event 115 being created at the top/first position in the LRU table 200. In this cache miss scenario, all of the remaining entries move down one position.

At 710, a count may be incremented in the entry at position 1 for the event group in which the inserted event 115 is classified.

An alternative process of implementing LRU-based event suppression is to utilize a separate correlator in the LRU-based event suppressor 118 that is configured to track a frequency of events 115, in general, without grouping the events 115, and monitoring the event frequency against an overall threshold to determine when to activate a suppression correlator 126. We can refer to this separate correlator as a "Frequency Threshold Correlator." In a sense, the frequency threshold correlator may coordinate the operation of the suppression correlators 126, instead of the suppression correlators 126 actively operating at all times. In this alternate embodiment, the frequency threshold correlator may detect when the frequency of observed events 115 exceeds a threshold frequency value. In the event that the threshold is exceeded, a particular suppression correlator 126 can be activated (or enabled) by the frequency threshold correlator sending a command to the particular suppression correlator 126. This effectively decouples the frequency thresholding from the event grouping mechanism.

In this alternate embodiment, the suppression correlator 126 may track a first count of a number of events 115 observed since the frequency threshold correlator activated the suppression correlator 126, and a second count of events in each event group maintained in the LRU table 200 of the suppression correlator 126. Once the suppression correlator 126 begins suppressing events, the suppression correlator 126 that was activated may send a control message that causes other suppression correlators 126 to reset and await a next signal from the frequency threshold correlator.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    observing, by a security agent executing on a computing device, events as observed events, the observed events being associated with processes executing on the computing device;
    inserting the observed events into a least recently used (LRU) table that tracks, for a subset of the observed events maintained in the LRU table, a rate-based statistic for multiple event groups in which the subset of the observed events are classified;
    tracking the rate-based statistic for an event group of the multiple event groups in the LRU table by:
        incrementing a count of the observed events that are classified in the event group each time an observed event in the event group is inserted into the LRU table; and
        iteratively calculating a value of the rate-based statistic for the event group by iteratively subtracting a predetermined value from the count at a predetermined time interval;
    determining that the value of the rate-based statistic for the event group satisfies a threshold value associated with the LRU table; and
    sending the observed events that are classified in the event group to a remote security system with suppression by refraining from sending, to the remote security system, at least some of the observed events that are classified in the event group.

2. The method of claim 1, wherein determining that the value of the rate-based statistic for the event group satisfies the threshold value associated with the LRU table comprises:
    monitoring the value of the rate-based statistic for the event group as the value is iteratively calculated; and
    determining that the value of the rate-based statistic for the event group, after an iterative calculation, exceeds the threshold value associated with the LRU table.

3. The method of claim 2, wherein the threshold value comprises a first threshold value, the method further comprising:
    determining that the value of the rate-based statistic for the event group, after an additional iterative calculation subsequent to the iterative calculation, is less than a second threshold value associated with the LRU table, the second threshold value being less than the first threshold value; and sending, to the remote security system, the observed events that are classified in the event group without the suppression.

4. The method of claim 2, wherein the threshold value comprises a first threshold value, the method further comprising:
determining that the value of the rate-based statistic for the event group, after an additional iterative calculation subsequent to the iterative calculation, does not fall below a second threshold value associated with the LRU table, the second threshold value being less than the first threshold value; and
sending, after a period of time since initiating the suppression, a notification to the remote security system indicating that the suppression is still ongoing, the notification including information regarding an event grouping scheme defined by the LRU table.

5. The method of claim 1, wherein inserting the observed events into the LRU table comprises inserting an observed event that is classified in the event group into the LRU table by:
comparing one or more property values of the observed event to property values of previously-observed events maintained in the LRU table;
determining whether the one or more property values of the observed event match one or more property values of the previously-observed events maintained in the LRU table; and
in response to determining that the one or more property values of the observed event match the one or more property values of the previously-observed events maintained in the LRU table, (i) moving an entry for the event group from an existing position in the LRU table to a first position in the LRU table and (ii) incrementing the count of the observed events that are classified in the event group; or
in response to determining that the one or more property values of the observed event do not match any of the property values of the previously-observed events maintained in the LRU table, (i) creating a new entry for the event group at the first position in the LRU table and (ii) incrementing the count of the observed events that are classified in the event group.

6. A system comprising:
one or more processors; and
a security agent configured to be executed by the one or more processors to:
observe events that occur on a computing device as observed events, the observed events being associated with processes executing on the computing device;
insert the observed events into a least recently used (LRU) table that tracks, for a subset of the observed events maintained in the LRU table, a rate-based statistic for multiple event groups in which the subset of the observed events are classified;
track the rate-based statistic for an event group of the multiple event groups in the LRU table by:
incrementing a count of the observed events that are classified in the event group each time an observed event in the event group is inserted into the LRU table; and
iteratively calculating a value of the rate-based statistic for the event group by iteratively subtracting a predetermined value from the count at a predetermined time interval;
determine that the value of the rate-based statistic for the event group satisfies a threshold value associated with the LRU table; and
send the observed events that are classified in the event group to a remote security system with suppression by refraining from sending, to the remote security system, at least some of the observed events that are classified in the event group.

7. The system of claim 6, wherein the LRU table comprises a first LRU table, the threshold value comprises a first threshold value associated with the first LRU table, the rate-based statistic comprises a first rate-based statistic, and the multiple event groups comprise multiple first event groups, and wherein the security agent is further configured to be executed by the one or more processors to:
insert the observed events into a second LRU table that tracks, for a second subset of the observed events maintained in the second LRU table, a second rate-based statistic for multiple second event groups in which the second subset of the observed events are classified, the multiple second event groups being different than the multiple first event groups, and the second rate-based statistic being calculated differently than the first rate-based statistic;
determine that a value of the second rate-based statistic for an additional event group of the multiple second event groups satisfies a second threshold value associated with the second LRU table; and
send the observed events that are classified in the additional event group to the remote security system with suppression by refraining from sending, to the remote security system, at least some of the observed events that are classified in the additional event group.

8. The system of claim 7, wherein:
the first LRU table defines a first event grouping scheme that classifies the observed events into the multiple first event groups according to a first set of event properties; and
the second LRU table defines a second event grouping scheme that classifies the observed events into the multiple second event groups according to a second set of event properties, the second set of event properties being different than the first set of event properties.

9. The system of claim 8, wherein the second set of event properties is a subset of the first set of event properties.

10. The system of claim 9, wherein:
the observed events correspond to process creation events;
the first set of event properties includes a parent process identifier (PPID) property, an Image File Name property, and a Command Line property; and
the second set of event properties includes the PPID property and the Image File Name property, but excludes the Command Line property.

11. The system of claim 8, wherein the second set of event properties includes a node degree property, and wherein a value of the node degree property for the additional event group indicates a number of sub-processes created by a process corresponding to an observed event that is classified in the additional event group.

12. One or more non-transitory computer-readable media storing computer-executable instructions for a security agent that, when executed by one or more processors of a computing device, perform operations comprising:

observing, by the security agent, events that occur on the computing device as observed events, the observed events being associated with processes executing on the computing device;
inserting the observed events into a least recently used (LRU) table that tracks, for a subset of the observed events maintained in the LRU table, a rate-based statistic for multiple event groups in which the subset of the observed events are classified;
tracking the rate-based statistic for an event group of the multiple event groups in the LRU table by:
incrementing a count of the observed events that are classified in the event group each time an observed event in the event group is inserted into the LRU table; and
iteratively calculating a value of the rate-based statistic for the event group by iteratively subtracting a predetermined value from the count at a predetermined time interval;
determining that the value of the rate-based statistic for the event group satisfies a threshold value associated with the LRU table; and
sending the observed events that are classified in the event group to a remote security system with suppression by refraining from sending, to the remote security system, at least some of the observed events that are classified in the event group.

13. The one or more non-transitory computer-readable media of claim 12, wherein determining that the value of the rate-based statistic for the event group satisfies the threshold value associated with the LRU table comprises:
monitoring the value of the rate-based statistic for the event group as the value is iteratively calculated; and
determining that the value of the rate-based statistic for the event group, after an iterative calculation, exceeds the threshold value associated with the LRU table.

14. The one or more non-transitory computer-readable media of claim 13, wherein the threshold value comprises a first threshold value, the operations further comprising:
determining that the value of the rate-based statistic for the event group, after an additional iterative calculation subsequent to the iterative calculation, is less than a second threshold value associated with the LRU table, the second threshold value being less than the first threshold value; and
sending, to the remote security system, the observed events that are classified in the event group without the suppression.

15. The one or more non-transitory computer-readable media of claim 13, wherein the threshold value comprises a first threshold value, the operations further comprising:
determining that the value of the rate-based statistic for the event group, after an additional iterative calculation subsequent to the iterative calculation, exceeds a second threshold value associated with the LRU table, the second threshold value being less than the first threshold value; and
sending, after a period of time since initiating the suppression, a notification to the remote security system indicating that the suppression is still ongoing, the notification including information regarding an event grouping scheme defined by the LRU table.

16. The one or more non-transitory computer-readable media of claim 12, wherein inserting the observed events into the LRU table comprises inserting an observed event that is classified in the event group into the LRU table by:
comparing one or more property values of the observed event to property values of previously-observed events maintained in the LRU table;
determining whether the one or more property values of the observed event match one or more property values of the previously-observed events maintained in the LRU table; and
in response to determining that the one or more property values of the observed event match the one or more property values of the previously-observed events maintained in the LRU table, (i) moving an entry for the event group from an existing position in the LRU table to a first position in the LRU table and (ii) incrementing the count of the observed events that are classified in the event group; or
in response to determining that the one or more property values of the observed event do not match any of the property values of the previously-observed events maintained in the LRU table, (i) creating a new entry for the event group at the first position in the LRU table and (ii) incrementing the count of the observed events that are classified in the event group.

17. The one or more non-transitory computer-readable media of claim 12, wherein the LRU table comprises a first LRU table, the threshold value comprises a first threshold value associated with the first LRU table, the rate-based statistic comprises a first rate-based statistic, and the multiple event groups comprise multiple first event groups, the operations further comprising:
inserting the observed events into a second LRU table that tracks, for a second subset of the observed events maintained in the second LRU table, a second rate-based statistic for multiple second event groups in which the second subset of the observed events are classified, the multiple second event groups being different than the multiple first event groups, and the second rate-based statistic being calculated differently than the first rate-based statistic;
determining that a value of the second rate-based statistic for an additional event group of the multiple second event groups satisfies a second threshold value associated with the second LRU table; and
sending the observed events that are classified in the additional event group to the remote security system with suppression by refraining from sending, to the remote security system, at least some of the observed events that are classified in the additional event group.

18. The one or more non-transitory computer-readable media of claim 12, wherein a size of the LRU table is defined such that the LRU table maintains no more than a predetermined number of event groups at a given time.

19. The method of claim 1, wherein a size of the LRU table is defined such that the LRU table maintains no more than a predetermined number of event groups at a given time.

20. The system of claim 6, wherein:
the LRU table defines an event grouping scheme that classifies the subset of the observed events into the multiple event groups according to a set of event properties; and
the observed events that are classified in the event group are classified in the event group based on the observed events sharing common values for the set of event properties.

* * * * *